US008285603B2

(12) United States Patent
Carlin et al.

(10) Patent No.: US 8,285,603 B2
(45) Date of Patent: Oct. 9, 2012

(54) METHOD AND SYSTEM FOR PROVIDING RECOMMENDATIONS AS PART OF A HOME ENERGY AUDIT

(75) Inventors: James A. Carlin, Chicago, IL (US); Jason R. Blumberg, Chicago, IL (US)

(73) Assignee: Revolution Environmental LLC, Chicago, IL (US)

(*) Notice: Subject to any disclaimer, the term of this patent is extended or adjusted under 35 U.S.C. 154(b) by 176 days.

(21) Appl. No.: 12/778,092

(22) Filed: May 11, 2010

(65) Prior Publication Data

US 2011/0016017 A1   Jan. 20, 2011

Related U.S. Application Data

(60) Provisional application No. 61/177,065, filed on May 11, 2009.

(51) Int. Cl.
*G06Q 30/00* (2012.01)

(52) U.S. Cl. ............... 705/26.7; 705/7.11; 705/26.61; 705/26.64; 705/314; 705/347; 705/412

(58) Field of Classification Search .......... 705/7.11, 705/7.29, 7.32, 7.36–7.37, 26.1–27.2, 308, 705/313, 314, 347, 348, 412
See application file for complete search history.

(56) References Cited

U.S. PATENT DOCUMENTS

| | | | | |
|---|---|---|---|---|
| 6,169,979 | B1* | 1/2001 | Johnson | 705/412 |
| 7,076,339 | B2* | 7/2006 | Yabutani et al. | 700/291 |
| 7,130,832 | B2* | 10/2006 | Bannai et al. | 705/412 |
| 7,246,014 | B2* | 7/2007 | Forth et al. | 702/60 |
| 7,822,647 | B1* | 10/2010 | Mussman et al. | 705/26.1 |
| 7,831,702 | B2* | 11/2010 | Johnson | 709/223 |
| 2004/0093134 | A1* | 5/2004 | Barber et al. | 701/29 |
| 2005/0043980 | A1* | 2/2005 | Edlin et al. | 705/8 |
| 2010/0042453 | A1* | 2/2010 | Scaramellino et al. | 705/7 |

OTHER PUBLICATIONS www.energystar.gov. Sep. 16, 2008. [recovered from Archive.org].*
Home & Family: A Quest for an Energy-Efficient House; We Undertake Four Home 'Audits'; The Pros vs. DIY Jane Hodges. Wall Street Journal. (Eastern edition). New York, N.Y.: Sep. 18, 2008. p. D.2.*
Redbook goes green Redbook. New York: Jul. 2008. vol. 211, Iss. 1; p. 131.*

* cited by examiner

*Primary Examiner* — William Allen

(57) ABSTRACT

A dynamic, fully-integrated computer-server-based platform (platform) provides users with tools for making informed decisions about available energy upgrades and for implementing desired home energy upgrades. In various embodiments, the platform provides various combinations of: (i) a variety of educational and assessment tools, including a Virtual Home Energy Audit (VHEA), which provides users with a customized home energy-savings plan detailing the financial and/or environmental impact of each upgrade alternative on a relative and absolute basis, (ii) product selection and purchase, (iii) access to arrangement and scheduling of in-home services through a network of professionals, (iv) financing solutions, and (v) a data registry that verifies completed upgrades and associated savings. The platform takes a holistic view of energy solutions, and provides tools across a broad spectrum of energy-related products and/or services.

20 Claims, 16 Drawing Sheets

Illustrative - Product Shopping Page Screen Shot

U.S. Energy Usage by Segment & Residential Energy Reduction Potential

Historical & Projected Residential Energy Usage & Greenhouse Gas Emissions

Historical & Projected Residential Energy Prices to Consumers

Figure 4:
List of products & energy services

| Items Executed Upon Through Product Selection and Purchase* | | |
|---|---|---|
| Appliances | Smart Energy Devices | Home Envelope |
| Washers & Dryers | Smart Power Strips | Weatherstripping |
| Refrigerators | Energy Monitors | Caulks & Foams |
| Freezers | Energy Monitor Software | Door Sweeps |
| Cooking Products | Timers | Storm Windows |
| Dishwashers | | Light Switch & Outlet Covers |
| Air Purifiers | Office Equipment | Duct Sealing |
| Humidifiers | All-in-one Copier/Fax/Scanners | DIY Kits |
| Dehumidifiers | Desktop Computers | Tools & Accessories |
| | Notebook/Laptop Computers | Doors |
| Lighting & Fixtures | Copiers | |
| Light Bulbs | Fax Machines | Home Electronics |
| Light Fixtures | Monitors | Answering Machines |
| Ceiling Fans | Printers | Aquariums |
| Controls & Sensors | Routers | Cordless Phones |
| Outdoor Solar Lighting | Smart Power Strips | Coffee Maker |
| Lighting Accessories | Scanners | CD/DVD Players |
| | | External Power Adapter |
| Heating & Cooling | Plumbing & Water | Microwaves |
| Thermostats | Faucets | Set-top Boxes |
| Room Air Conditioning | Showerheads | Televisions |
| Portable Heaters | Instant Hot Water | Stereo Systems |
| Upright Fans | Toilets | |
| | Water Dispensers & Filters | |
| | Water Heater Blankets | |
| | Pipe Insulation | |

| Items Executed Upon Through Service Management and Execution* |
|---|
| Home Systems |
| Heating Ventilation & Air Conditiong |
| Water Heaters |
| Insulation |
| Sealing & Weatherization |
| Windows & Skylights |
| Solar Systems |
| Electric Vehicle Charging |
| Geothermal Energy Generation |
| Micro Wind Generation |
| |
| Outdoor Appliances |
| Hot Tub/Spa |
| Pool Pump |
| Pool Heater |

* Not Exhaustive

McKinsey & Co's – US Energy Efficiency Supply Curve Estimate To 2020

Process Flow & User Experience

Figure 7:

Illustrative - Virtual Home Energy Audit User Input Screen Shot

Illustrative - Customized Energy Savings Plan Screen Shot

Additional Notes: Example sliced at black line and certain output items have been excluded in order to provide a full perspective on the approach.

Figure 9:

Illustrative - Customer Shopping List with Selected Services & Products Screen

Illustrative - Product Shopping Page Screen Shot

Illustrative - Order Services Step 1 – User Formally Requests In-Person Estimate Illustrative - Order Services Step 2 – User Selects Online or Phone to Schedule Illustrative – Order Services Step 3 – User Selects Requested Service Dates Illustrative - Manage Upgrades Interface Illustrative - Manage Upgrades Interface – Invoice Illustrative – Registry of completed upgrades

METHOD AND SYSTEM FOR PROVIDING RECOMMENDATIONS AS PART OF A HOME ENERGY AUDIT

CROSS-REFERENCE TO RELATED APPLICATIONS

This application is related to and claims priority to U.S. Provisional Patent Application Ser. No. 61/177,065, filed May 11, 2009, the disclosure of which is hereby incorporated by reference herein.

BACKGROUND

The global energy crisis and the immediate need for energy responsibility are among the most important and urgent issues facing society today. The impact of human activities in increasing the emission of harmful greenhouse gases ($CO_2e$), and the resulting repercussions of global climate change is a crucial issue jeopardizing U.S. national security, as well as global stability. It is now more imperative than ever that the global community works together to assess and implement solutions to this crisis in a thoughtful and efficient manner.

According to the United States Department of Energy (DOE), energy consumption by residential consumers registered over $225 billion for calendar year 2006, representing roughly 20% of the total United States energy spending, or 5% of global energy demand. This residential energy consumption represents 21 quadrillion British Thermal Units (BTUs) each year, and results in the emission of approximately 1.2 billion metric tons of greenhouse gas ($CO_2e$) (FIG. 1 illustrates the breakdown of energy usage in the United States by segment and an estimate of energy reduction potential in the residential sector). On Apr. 17, 2009, the United States Environmental Protection Agency (EPA) issued a report that included findings highlighting the impact of greenhouse gases, indicating that the continued proliferation of greenhouse-gas emissions "endangers public health and welfare." The EPA said in its findings that, "in both magnitude and probability, climate change is an enormous problem." The EPA had previously reported in its "Inventory of U.S. Gas Emissions and Sinks: 1990-2007," that in the period of 1990 through 2007, emission of carbon dioxide, the principal greenhouse gas emitted from energy generation, rose over 20%.

In its Apr. 17, 2009 report, the EPA concluded that the science pointing to man-made "pollution" as the cause of global warming is "compelling and overwhelming." FIG. 2 of the present disclosure provides a visual depiction of the projected increase in U.S. residential energy consumption, along with the projected increase in $CO_2e$ emissions, both emphatically depicting the need for improved energy efficiency and $CO_2e$ reduction. It should also be noted that this increased energy consumption will likely translate into an associated increase in energy costs to consumers, as depicted in FIG. 3 of the present disclosure, which may put additional strain on consumer's budgets.

The current and prospective environmental impact of this residential energy usage is staggering, contributing greatly to the exacerbation of $CO_2e$ emissions and the harmful effects of climate change. While the issue is formidable, there is an important and urgent opportunity to provide residential energy consumers with the right set of tools to capitalize on home upgrades that provide for more efficient consumption of energy. Today, there are numerous product-based and/or service-based solutions that are available to consumers to reduce their energy usage, thereby generating cost savings to the consumer, and simultaneously reducing their negative impact on the environment by abating harmful greenhouse-gas emissions associated with energy generation and consumption. This reduction in energy usage can be significant with a potential reduction of 30% for the average homeowner. Many of these home upgrades offer an attractive financial return, as measured by a variety of financial metrics including the Internal Rate of Return (IRR), Return on Investment (ROI) and Payback Period. (FIG. 5 provides a study performed by McKinsey & Company in July 2009 measuring energy-reduction opportunities.)

With the significant opportunities available to consumers to reduce their energy usage and associated energy costs, and substantially limit the harmful impact of their energy usage on the environment, it is warranted to ask the very relevant question that the inventors have spent considerable time analyzing; "Why don't consumers take action and capitalize on these opportunities?"

Five principal barriers that may contribute to inaction on the part of consumers are:

(i) Lack of consumer "mind share": There is a general lack of consumer education and awareness with regard to energy efficiency and renewable-energy alternatives. Many consumers are unaware of the energy-saving home upgrades that are available to them, and/or are unaware of the incentives (federal, state, local tax incentives, etc.) that are available to them to make these upgrades;

(ii) Assistance in prioritizing upgrades: Even if consumers are aware of available upgrades and incentives, they often struggle to prioritize these upgrades and assess the optimal upgrades for their specific circumstance. This includes analyzing the upgrade cost (net of incentives) versus the post-upgrade benefits (measured using a number of financial metrics including ROI, IRR, and Payback Period);

(iii) Upfront costs: The upfront costs associated with home upgrades can often be an impediment to capturing these energy-saving opportunities. While future savings are attractive, the upfront costs to perform upgrades can be a significant deterrent. Additionally, the cost of an in-person energy audit from a trained professional can also present additional upfront costs to the consumer and act as a deterrent;

(iv) Uncertainty in "value translation": Consumers are often concerned about whether the upgrades that they perform to reduce their home's energy usage/bills will also increase the value of their home. Many energy-saving home upgrades are less transparent than other home renovations. This lack of transparency and concern over whether such upgrades will increase the home's value can cause inaction or compel the consumer to focus on upgrades that are more cosmetically noticeable but that produce less attractive financial and environment impact; and (v) Overall complexity of the process: The process of assessing, implementing, and financing energy-saving home upgrades can be an imposing task for a consumer. The upgrade implementation process alone can require researching, selecting and shopping for multiple products, and/or identifying and researching multiple service professionals to perform desired service-based upgrades. This complexity often proves to be a significant barrier for consumers.

The present disclosure addresses these barriers, as well as others, making energy responsibility more easily and readily attainable for residential energy consumers.

SUMMARY

The present methods and systems seek to make saving energy easy and attainable for all consumers by way of an easy-to-use platform that is provided using a computer server. This platform offers consumers much if not all that they need to research, assess, implement, finance, and track energy-saving upgrades to their home. These tools are provided in part by way of a complete and fully-integrated user interface that addresses the above-identified barriers to action on the part of consumers, as well as other barriers not explicitly specified herein.

The platform takes a holistic approach to home energy usage, focusing not simply on one product and/or service, but rather offering a full range of products and/or services (herein Upgrades). This allows the consumer to select and implement the Upgrades that are most appropriate for them, and with which they are most comfortable.

Some of the functions that may be carried out in various combinations and in various embodiments by the above-mentioned platform—as part of creating an end-to-end consumer solution—are summarized below.

Module 1: Research & Assess Upgrades

M1.1 Provide Educational and Assessment Tools: The platform offers a complete range of educational and assessment tools that allow consumers to research and assess available energy-saving Upgrades, both on an independent and relative basis. The cornerstone of the educational and assessment tools is the proprietary functionality referred to herein as the Virtual Home Energy Audit (VHEA). The VHEA allows the user to create a personalized home energy-savings plan, which identifies recommended upgrades for their home. The VHEA prompts the user for responses to a targeted set of questions (FIG. 7 provides a representative user input page for the VHEA). The user's responses are then combined with numerous key variables, including weather and temperature patterns, energy prices, etc., and processed through a series of algorithms to create a customized energy-savings plan for the particular user. The user can then evaluate the potential upgrades included in that customized plan, and create their desired shopping list (FIGS. 8 and 9 provide a representative energy savings plan and shopping list, in accordance with at least one embodiment).

Module 2: Implement Upgrades

M2.1 Enable and Facilitate Product Selection and Purchase: The platform also offers sales of an extensive range of energy-saving product Upgrades. Further, the platform seeks to educate consumers on what products within each category are most appropriate for them.

M2.2 Facilitate Service Execution by Experienced Professionals: The platform offers access to a full range of in-home service Upgrades through a network of experienced professionals. The platform includes a unique Service Management System (SMS) that allows the user to monitor and manage the service upgrade process from start to finish, providing convenience and transparency throughout (FIGS. 11-14 provide visual representations of at least one embodiment of the SMS). Activities managed through the SMS include, but are not limited to, the exchange of service estimates and work scope, the exchange of invoices, scheduling work estimates and service appointments and other service management tasks.

Module 3: Finance & Track Upgrades

M3.1 Offer Access to Financing Solutions: The platform offers access to optional financing solutions to help consumers capitalize on energy-saving opportunities and begin reaping the benefits.

M3.2 Maintain a Registry of Completed Upgrades: The platform maintains a registry of energy upgrades, allowing consumers to verify and track completed upgrades, as well as the financial impact and/or environmental impact that these upgrades generate (FIG. 15 provides a illustrative representation of an embodiment of such a registry).

Each of these functions provided by the platform seeks to mitigate or solve at least one of the above-identified principal barriers to action on the part of the consumer, as well as other problems. Once a user creates an account through the platform, all of their information is stored, and the user can both access their information and manage the process through the "Your Home Energy Headquarters" (Energy Headquarters) part of the user interface, which of course could take on different names in different embodiments. From the Energy Headquarters, the consumer is able to easily access each of the tools of the platform, seamlessly creating an energy-savings plan, selecting and managing upgrades, and tracking completed upgrades (FIGS. 8-15 illustrate various screens of a user interface of the Energy Headquarters in accordance with at least one embodiment).

It should be noted that the platform was designed to accommodate the varying objectives of different consumers. As such, various users may wish to use the combination of tools and functions made available by the platform to achieve their goals, which may be general, which may be all-encompassing, and which may instead be targeted and specific. Certainly numerous such sets of goals exist. (FIG. 6 provides an overview of illustrative user-process flows in accordance with at least one embodiment).

One embodiment of the platform may include functional modules M1.1, M2.1 and M2.2, and not include functional modules M3.1 and M3.2 above; such an embodiment represents the first-of-its-kind that combines educational and assessment tools with the delivery and implementation of a full spectrum of energy-efficient and renewable energy products and services (Upgrades), thereby taking a holistic approach to energy solutions. (FIG. 4 provides an example of a list of product and service offerings, in accordance with at least one embodiment). Some embodiments of the platform also include at least one of functional modules M3.1 and M3.2, which may be used in certain embodiments together or independently along with M1.1 and M2.1 and/or M2.2, each providing a unique set of tools, user experience and method.

BRIEF DESCRIPTION OF THE DRAWINGS

FIG. 4 illustrates available product and service home Upgrades available through the system;

FIG. 7 illustrates one embodiment within the operation of the method, defining the "basic information" portion of the user inputs for the Virtual Home Energy Audit;

Figure 9:
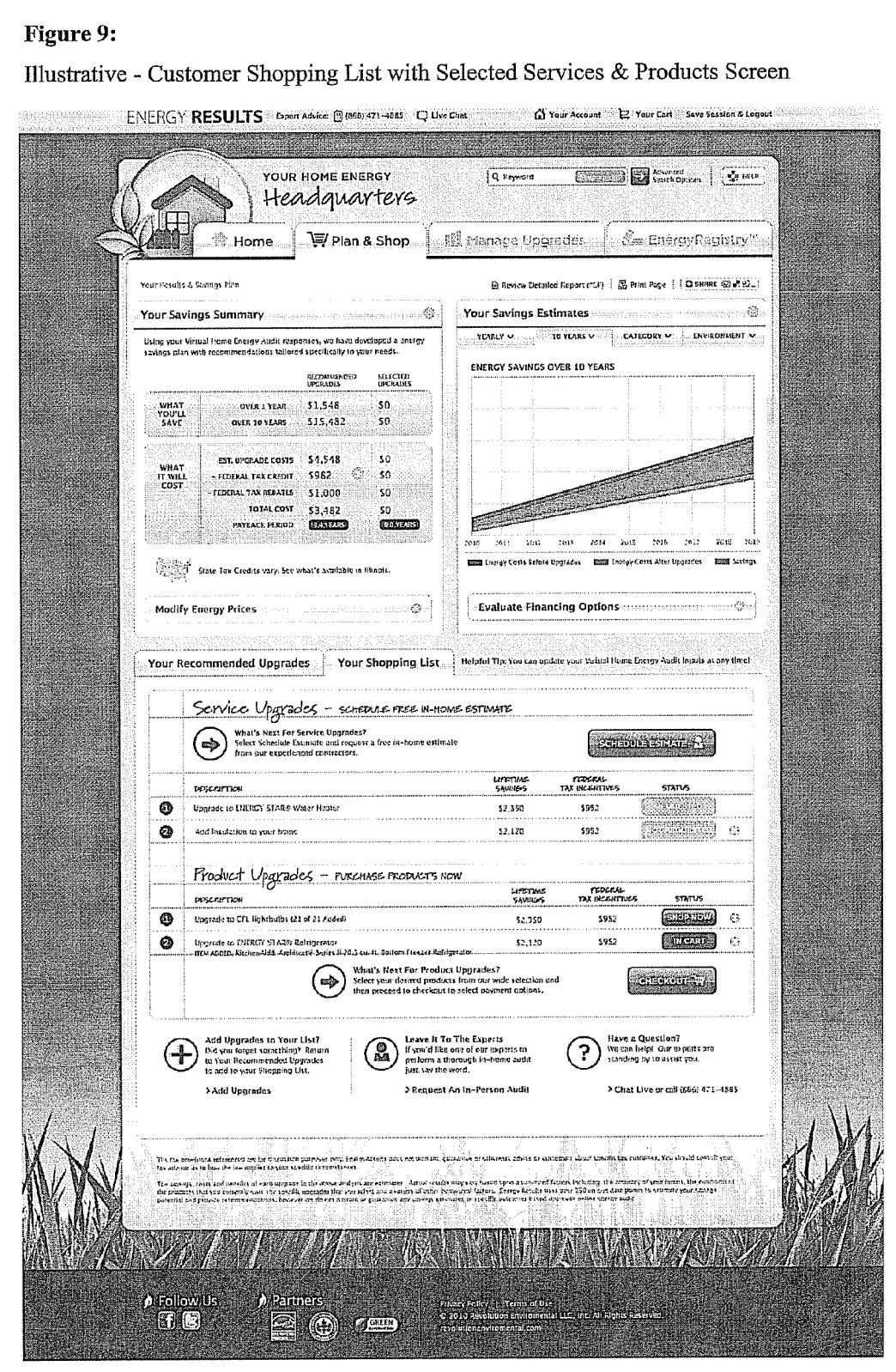

FIG. 9 illustrates one embodiment within the operation of the method, defining the customer shopping list with selected Upgrades;

DETAILED DESCRIPTION

Definitions

Figure 1:
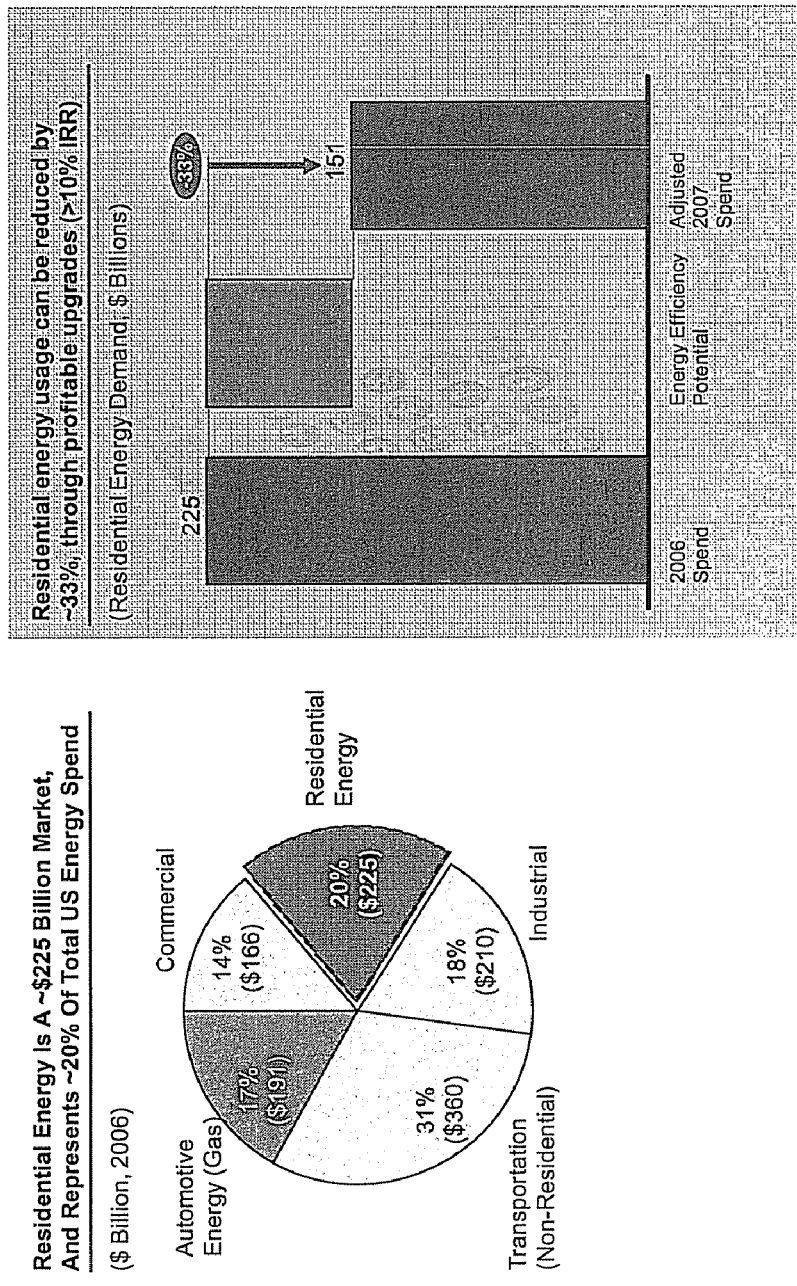
FIG. 1 illustrates the breakdown of residential energy usage in the United States by user segment and an estimate of energy reduction potential in the residential sector.
Figure 2:
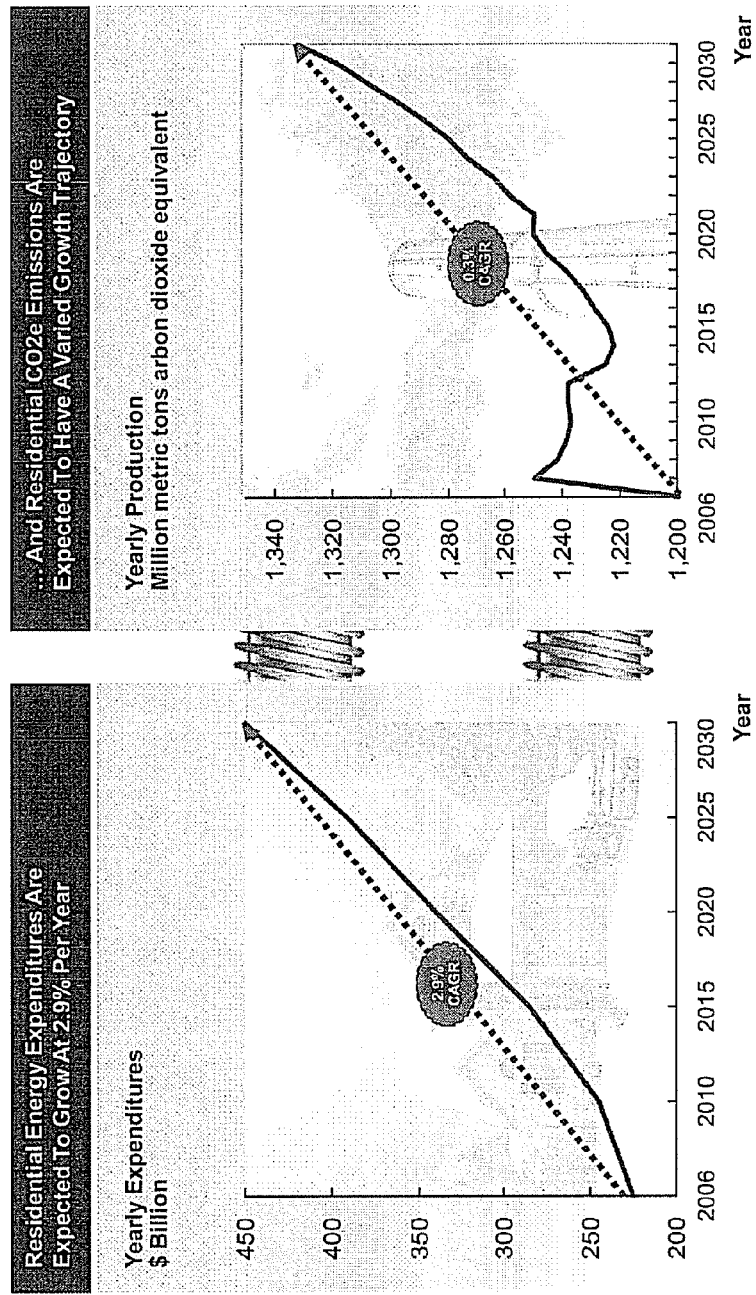
FIG. 2 illustrates the historical and projected energy usage by residential energy consumers; and their contribution to greenhouse gas emissions.
Figure 3:
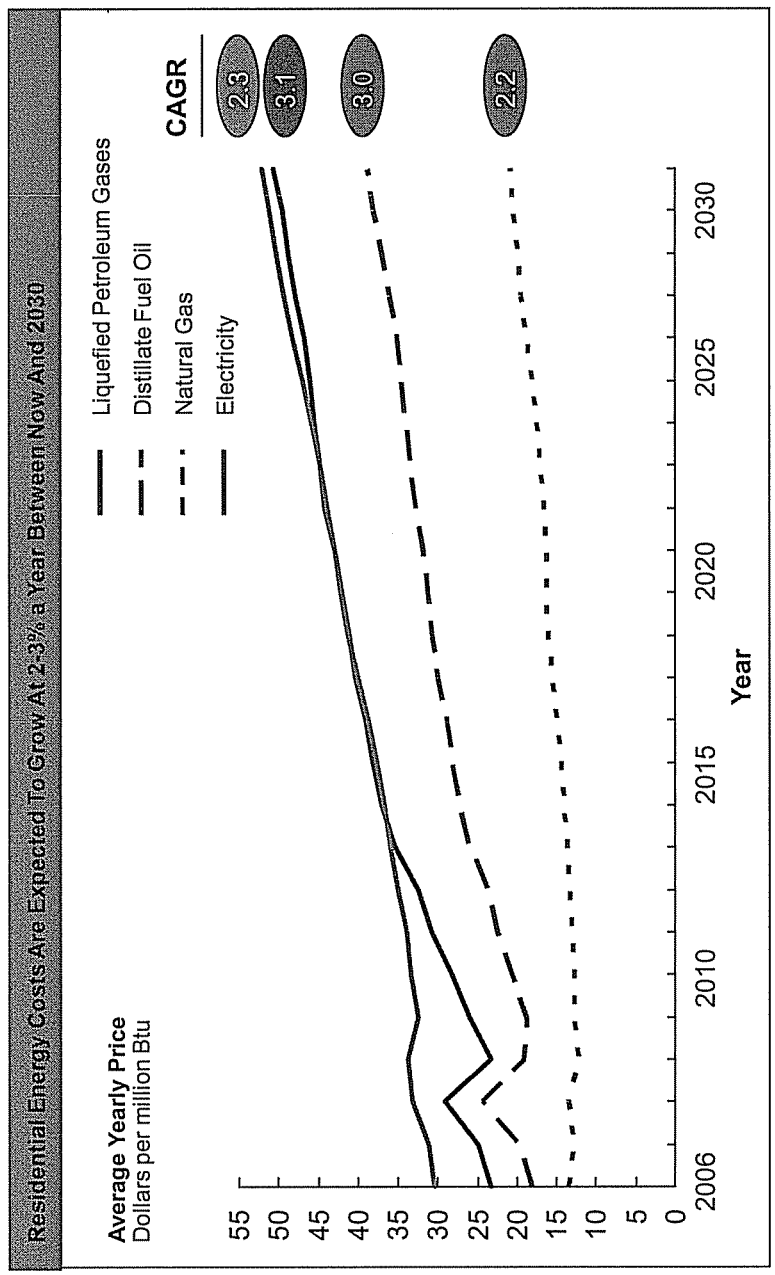
FIG. 3 illustrates historical & projected residential energy prices to consumers.
Figure 5:
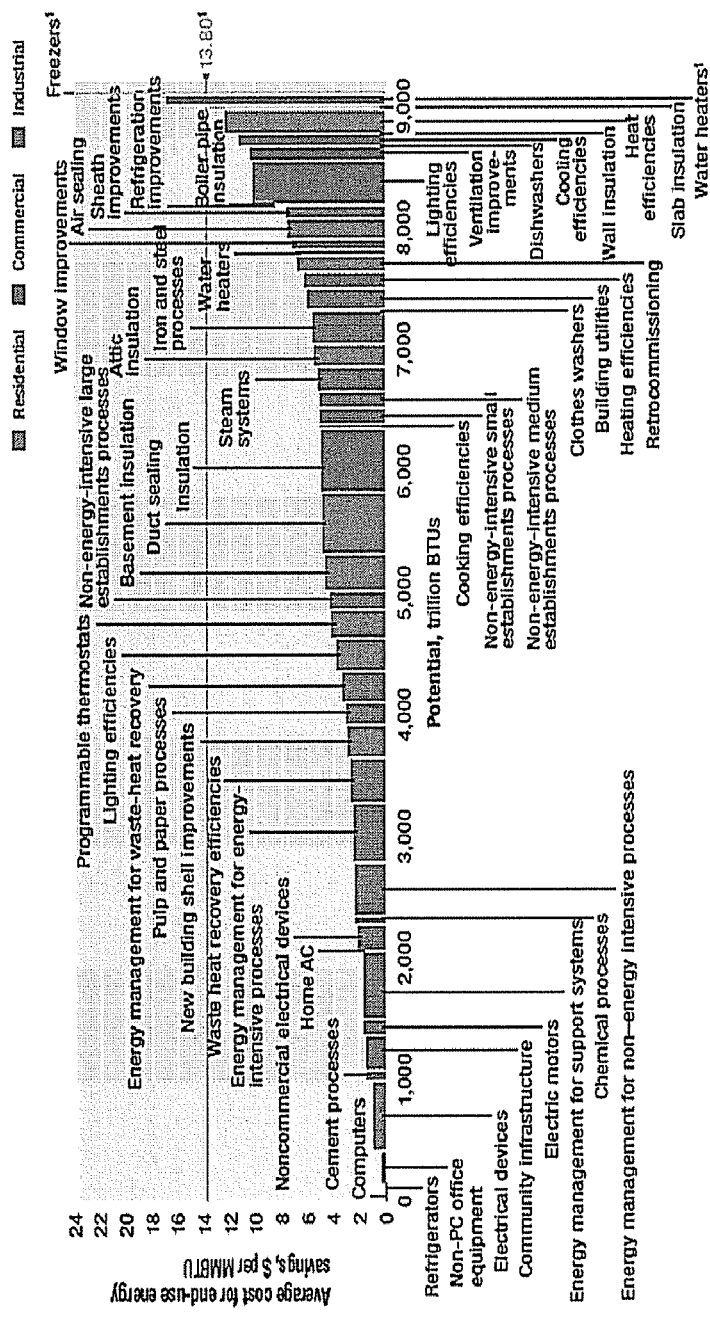
FIG. 5 illustrates the energy efficiency supply curve estimate as per McKinsey & Company's "Unlocking Energy Efficiency in the U.S. Economy" dated July 2009.
Figure 6:
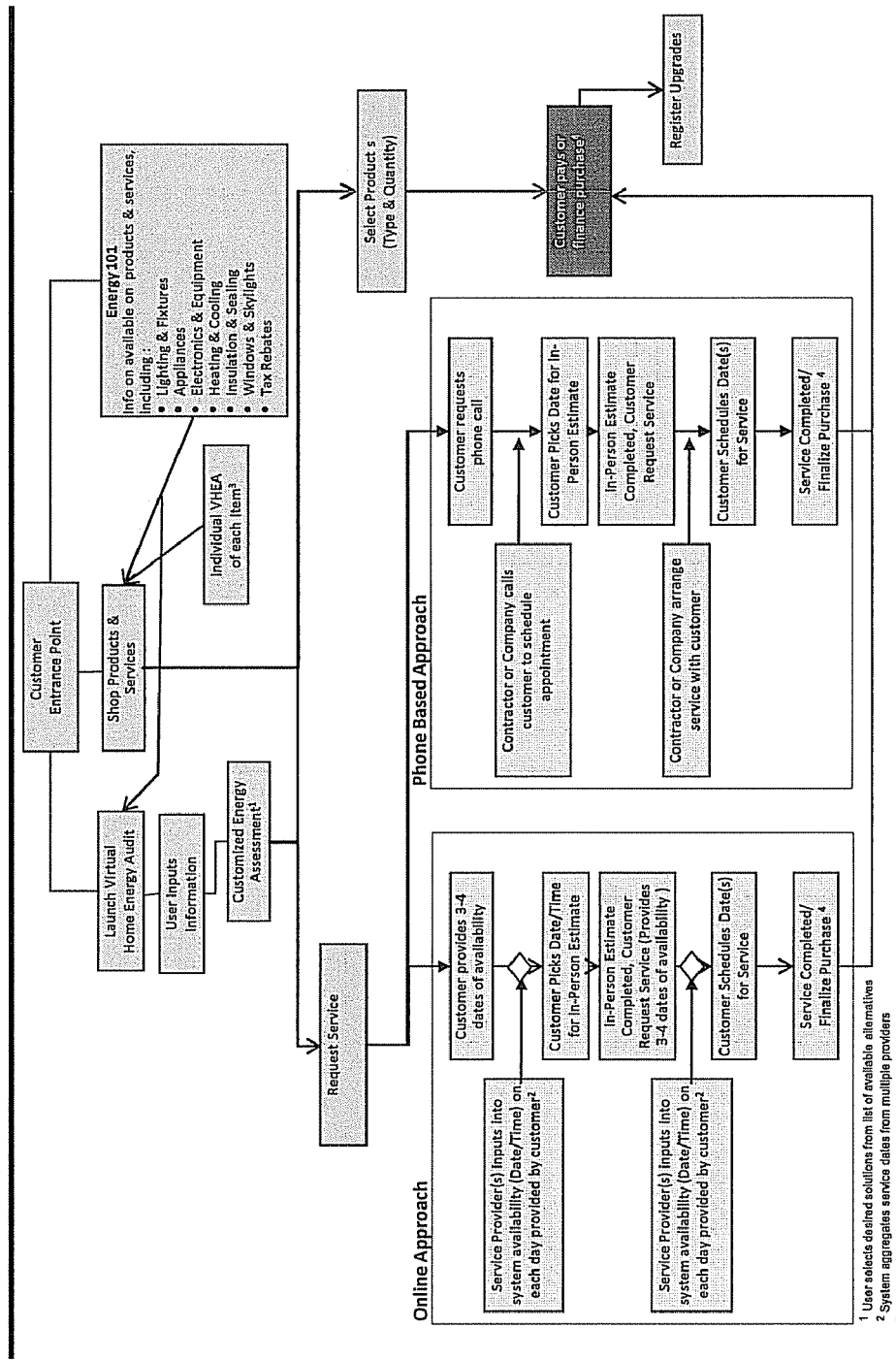
FIG. 6 illustrates the potential user process flows through at least one embodiment of the method described herein.

American Recovery & Reinvestment Act of 2009 (AR&R): The AR&R was enacted by the 111$^{th}$ United States Congress and signed into law by President Barack Obama on Feb. 17, 2009. This act of Congress was aimed at economic stimulus. The AR&R includes several provisions aimed at the energy sector, including energy efficiency and alternative energy.

$CO_2e$: $CO_2e$ is a calculation of the equivalent level of carbon dioxide (CO2) concentration that would cause the same level of radiative force as a given type and concentration of greenhouse gas. Examples of such greenhouse gases are methane, nitrous oxide, ozone, chlorofluorocarbons and water vapor. $CO_2e$ is expressed as Parts Per Million by Volume (PPMV).

Consumer: Herein, the term consumer is used to refer to the user of the presently disclosed methods and systems. The terms consumer and user are generally used synonymously throughout this document.

Energy Headquarters: Upon creating an account through the platform, a user is presented with a "dashboard" or portal that provides them with easy and intuitive access to the tools (modules) offered in the platform. This dashboard is referred to as "Your Home Energy Headquarters" in the user experience.

Environmental Impact: Analysis of the $CO_2$ and $CO_2e$ reduction potential, providing the user with an objective analysis of the impact their decisions has on the environment. The Environmental Impact is preferably depicted in user-friendly, easy-to-understand terms, comparing the impact of their decisions to other related environmental decisions and/or actions (e.g., planting a certain number of trees, providing the same Environmental Impact as the consumer's action).

Financial Impact: The financial impact of each upgrade and/or set of upgrades is quantified in some embodiments in terms of the (a) total cost to the user, which may include upfront cost and/or ongoing cost relative to the (b) total savings potential, which may include both the available government tax benefits and specific contributed ongoing energy cost savings. This cost-benefit analysis generates metrics for the user to help assess the relative benefits of each product and/or service upgrade or set of upgrades on a relative basis. These metrics may include the Internal Rate of Return (IRR), Return On Investment (ROI), and/or Payback Period.

Internal Rate of Return (IRR): IRR is a capital budgeting metric that can be used by individuals to decide whether they should make a certain investment. IRR can be defined as the effective compounded rate of return that is expected to be returned on invested capital over a given period of time. IRR is generally expressed as a percentage.

Payback Period: Payback Period refers to the period of time required for the return of an investment to repay the sum of the original investment, and as such may be expressed in terms of days, weeks, months, years. etc.

Platform: The platform, as referred to in this document, is a combination of a user interface, communications functions, and processing functions performed at least in part by a computer server designed to provide the user with numerous tools to achieve their objectives with respect to energy education, assessment and implementation of energy-saving (or producing in the case of renewable energy) solutions. The platform provides various elements in various combinations and in various embodiments, examples of such elements including (i) educational and assessment tools (including the VHEA, defined below), (ii) product selection and purchase, (iii) service execution by experienced professionals (through the SMS, defined below), (iv) financing solutions, and a (v) registry of completed upgrades. The user may use all or any combination of these elements to achieve his or her desired objective(s).

Return on Investment (ROI): Return on Investment is calculated as the ratio of money gained or lost (realized or unrealized) on an investment relative to the amount of money invested over a specified period of time. ROI is generally provided on a percentage basis.

Service Management System (SMS): The Service Management System is a computer-server-based tool that allows users to order services, and manage the service process from start to finish. The SMS allows for easy and transparent exchange of service estimates and work scope, invoices and other forms of communication between service professionals and the consumer. The SMS also facilitates the scheduling process for home appointments for estimates and/or service.

Sub-Segment: A combination of one or more key tools or modules of the platform.

United States Environmental Protection Agency (EPA or USEPA): The EPA is an agency of the federal government of the United States charged to regulate chemicals and protect human health by safeguarding the natural environment: air, water, and land.

United States Department of Energy (USDOE or DOE): The DOE is a Cabinet-level department of the United States government, responsible for energy policy and nuclear safety. Its responsibilities include the nation's nuclear weapons program, nuclear reactor production for the United States Navy, energy conservation, energy-related research, radioactive waste disposal, and domestic energy production.

Upgrades: Refers to home improvements that reduce energy consumption through the more efficient use of energy and/or the generation of energy through renewable energy technologies such as solar, wind and geothermal. Upgrades include, but are not limited to, the replacement of products that consume energy in the home, including appliances, heating and cooling systems, office equipment, electronics, energy generating systems and other such energy using devices or equipment. Upgrades may also include, but are not limited to, services associated with the installation or maintenance of product upgrades or other such home services that improve home energy consumption. Services may include, but are not limited to, sealing and weatherizing the envelope of the home, insulating the envelope of the home, installation of energy generating systems, installation of home heating and cooling systems, installation of appliances, replacement of windows, doors or skylights and other such upgrades. The term "upgrades" is occasionally, but not always, used synonymously with the word "solutions" herein.

Virtual Home Energy Audit (VHEA): The VHEA is a unique analytical functional module providing a tool that allows users to analyze an upgrade or set of upgrades to determine its respective independent and relative financial impact and environmental impact. The VHEA prompts users for answers to a defined set of questions (including, but not limited to Basic Information about the user's home, Heating and Cooling Systems, Water Heating Systems, Appliances, Lighting and Fixtures, Electronics, Water-Using Devices and elements of the Envelope of the Home including Windows, Doors and Skylights) combines this data with information that is stored in the VHEA model about, perhaps among other data points, energy prices and weather patterns in the user's geographic region, and processes this information using a series of algorithms in order to determine the energy efficiency and/or renewable energy generation of the solution or set of solutions. The VHEA provides a variety of analytical tools to help residential energy consumers to identify and assess the most appropriate energy solutions for them.

Representative Assisted: The service management portion of the platform managed by a person or group of people. Such person or groups of people are herein referred to as the Representative(s).

As described herein, the present platform is designed to address each of the above-identified barriers, perhaps among others, that consumers encounter in their effort to become more responsible energy users. In particular:

Educational & Assessment Tools mitigate the "lack of consumer mind share" barrier by offering easy-to-use tools to help consumers research and evaluate energy-saving upgrades. Further, the VHEA solves the need for "assistance in prioritizing upgrades" barrier by creating a customized savings plan for each user, wherein the plan prioritizes recommended upgrades.

Financing Solutions mitigate the barrier presented by "upfront costs." Further, the VHEA also contributes to mitigation of "upfront costs" by providing a (preferably) free online energy audit, which allows the consumer to pre-screen energy saving opportunities. They can then elect to request an in-home energy audit or simply use the VHEA generated energy savings plan to guide their purchasing decisions.

The Registry of Completed Upgrades mitigates the "uncertainty in value translation," allowing the consumer to verify completed upgrades and associated cost savings to future home buyers or other third parties. Further it promotes "awareness" around home-energy costs, which also contributes to mitigating the "lack of consumer mind share."

The platform serves to solve the "complexity" associated with the process. The platform provides a complete offering of tools (modules) to help the consumer achieve their energy-saving goals from start to finish. The seamless transition from evaluating upgrades, to integrated Product Selection & Purchase and Service Execution by Experienced Professionals across a full range of products and services is truly unique. Integrated Financing Solutions and the Registry of Completed Upgrades further enhance this unique platform, and mitigate the "complexity" often associated with the process.

The user may utilize each of these tools (modules) to achieve their objectives, or alternatively, they may wish to utilize a Sub-Segment of these tools to achieve their specific objectives. At each level, the platform is designed to be simplistic, intuitive and user-friendly. The introduction page to the platform provides a defined set of "launch points," which have been specifically designed to help users achieve their desired energy-solution objectives by providing the capability to broaden or narrow the scope of the process at any point to modify their desired information and outcome.

For descriptive purposes, a step-by-step overview is provided of the most extensive embodiment of the server-based platform, incorporating each of the modules described previously. It is important to reiterate however that the user can choose to narrow the scope of the process with a user-defined Sub-Segment of these elements to achieve their objectives, and that some embodiments may include some but not all of these elements/tools. This more defined process scope still provides an improved experience for the user and a unique method.

In some embodiments, the platform may be provided by a networked server (which could be a group of servers) comprising at least one (e.g. Ethernet and/or Wi-Fi) communication interface, at least one processor, and data storage containing instructions executable by the at least one processor for causing the networked server to carry out at least some of the functions recited herein. Furthermore, one or more users may access and interact with the platform by way of personal computing devices such as computers, desktop computers, laptop computers, e-readers, tablet devices, PDAs, cell phones, etc., and in particular may utilize browsing software available on such devices.

M1; Research & Assess Upgrades:

M1.1; Provide Educational and Assessment Tools: The user begins by selecting an option to complete the Virtual Home Energy Audit (VHEA).

Figure 7:
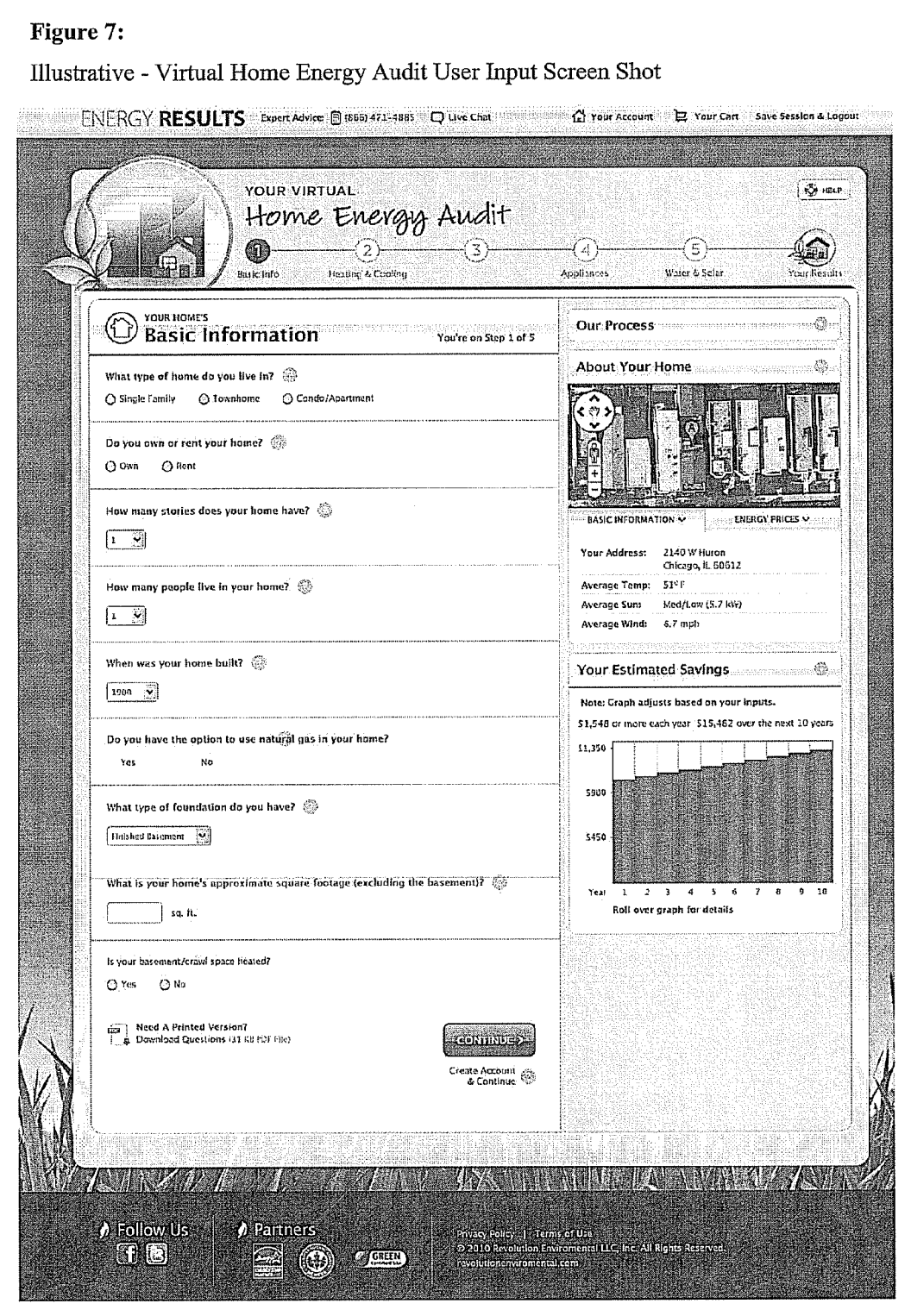
Figure 8:
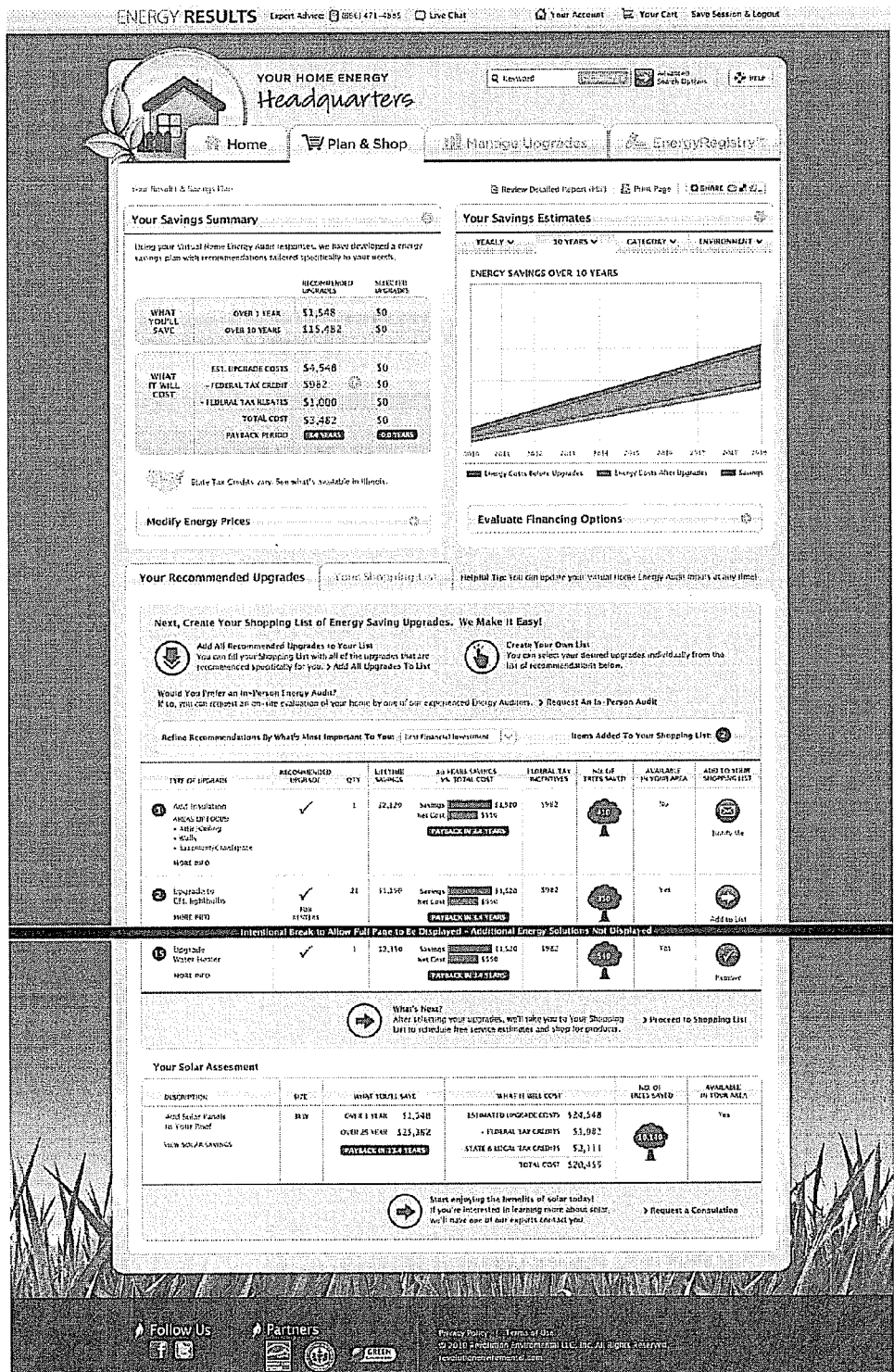
FIG. 8 illustrates one embodiment within the operation of the method, defining the customized energy savings plan presented to the user as a product of the Virtual Home Energy Audit.

M1.1(a): The VHEA asks the user a defined set of questions about their place of residence and specifics about their home. In addition to FIG. 7 which illustrates questions regarding Basic Information about the user's home, questions will also address certain elements of the home including, but not limited to, Heating and Cooling Systems, Water Heating Systems, Appliances, Lighting and Fixtures, Electronics, Water-Using Devices and elements of the Envelope of the Home including Windows, Doors and Skylights. The VHEA then takes the data entries inputted by the user and combines them with stored information embedded and updated in the VHEA, including current and historical energy prices and weather patterns by geographic location. The user's data entries and the stored information are combined and then processed through numerous energy-efficiency and/or energy-generation algorithms, as applicable, to generate a customized energy savings plan and analysis for the user (see FIG. 8).

M1.1(b): The VHEA then provides the user with a customized set of recommended energy Upgrades, perhaps in the form of a report displayed on a screen of the user's computer (e.g. web browser), and/or in the form of a printed report and/or any other suitable method for providing output to a user. This set of Upgrade alternatives includes a broad range of energy-efficient products and/or services, or perhaps a combination of energy-efficient products and associated services to implement those products, as well as renewable-energy technologies and associated products and services (see FIG. 4 for a list of Upgrades, though such list in not intended to be inclusive of all possible Upgrades and may be amended at any time).

The customized energy-savings plan provides detailed information about the financial impact and/or environmental impact of each Upgrade alternative, allowing the user to make an informed decision about which Upgrade or set of Upgrades is most appropriate for them. The financial impact of each Upgrade and/or set of Upgrades may be quantified in terms of the (a) total cost to the user, which may include upfront cost and/or ongoing cost relative to the (b) total savings potential, which may include both the available government tax benefits and specific contributed ongoing energy cost savings. This cost-benefit analysis generates metrics for the user on to help assess the relative benefits of each Upgrade or set of Upgrades. These financial metrics may include the IRR, ROI, and/or Payback Period. This information may be presented in such a way that the user can understand and evaluate the results and then make an informed purchasing decision. This customized analysis also provides information on the environmental impact of each Upgrade and/or set of Upgrades. This analysis provides the user with an objective analysis of the impact their decisions have on the environment.

The VHEA results may be sorted and ranked by the user using one or more of the aforementioned financial or environmental metrics, so that the user can prioritize the analysis based on the metric or metrics that are most important to that specific user. This customized energy assessment was specifically designed to help educate the consumer and allow a user-friendly and (preferably) no-cost means for them to assess available upgrade alternative, thereby allowing the user to make an informed decision.

M1.1(c): The user then selects the products and/or services that are most appropriate for them based on the customized analysis and proceeds to the implementation module (phase) of the process.

Figure 10:
FIG. 10 illustrates one embodiment within the operation of the method, defining a portion of the product selection and purchase module.
Figure 11:
FIG. 11 illustrates one embodiment within the operation of the method, defining the formal request for an in-person estimate through the Service Management System.
Figure 12:
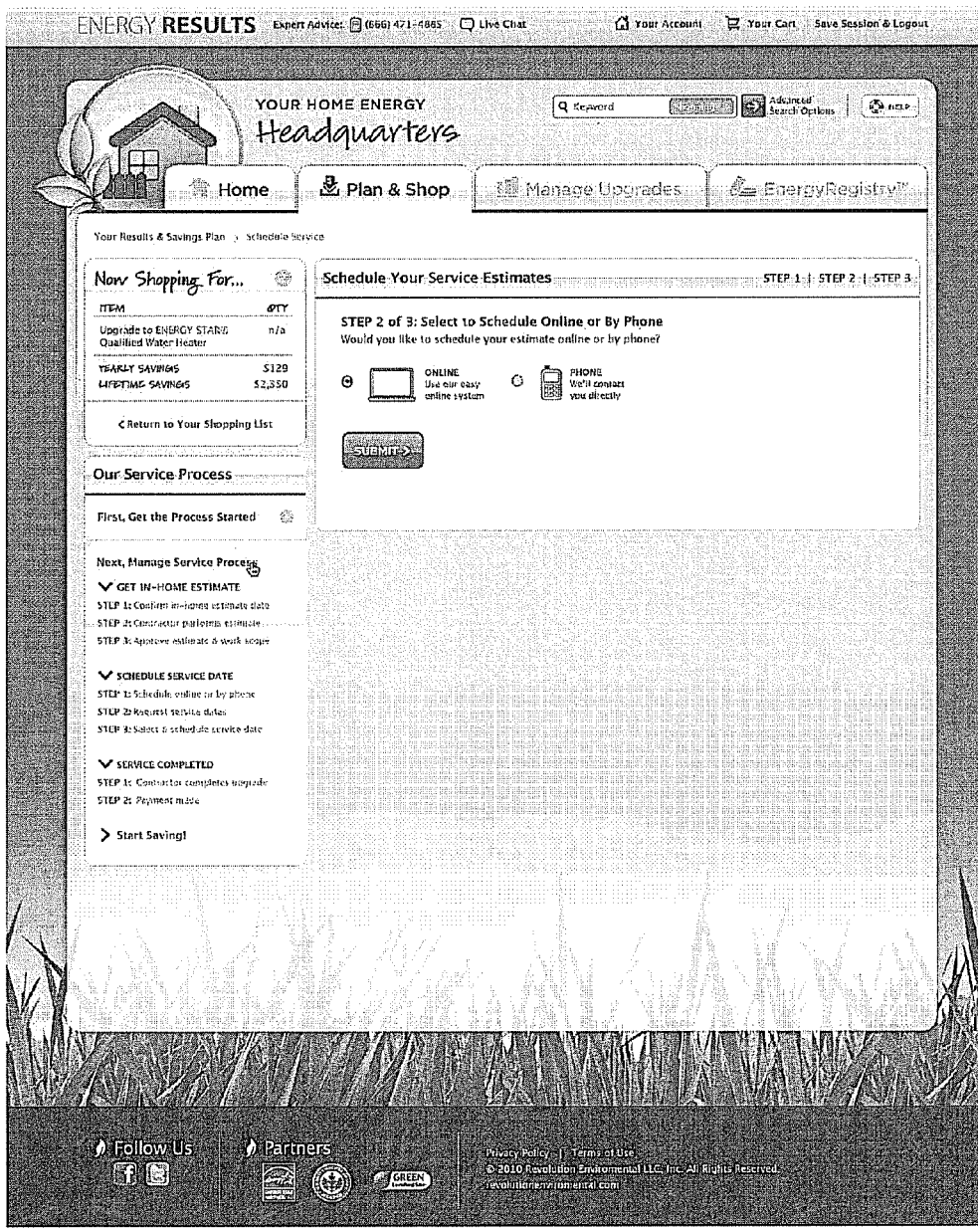
FIG. 12 illustrates one embodiment within the operation of the method, defining the user request to schedule an in-person estimate by phone or online through the Service Management System.
Figure 13:
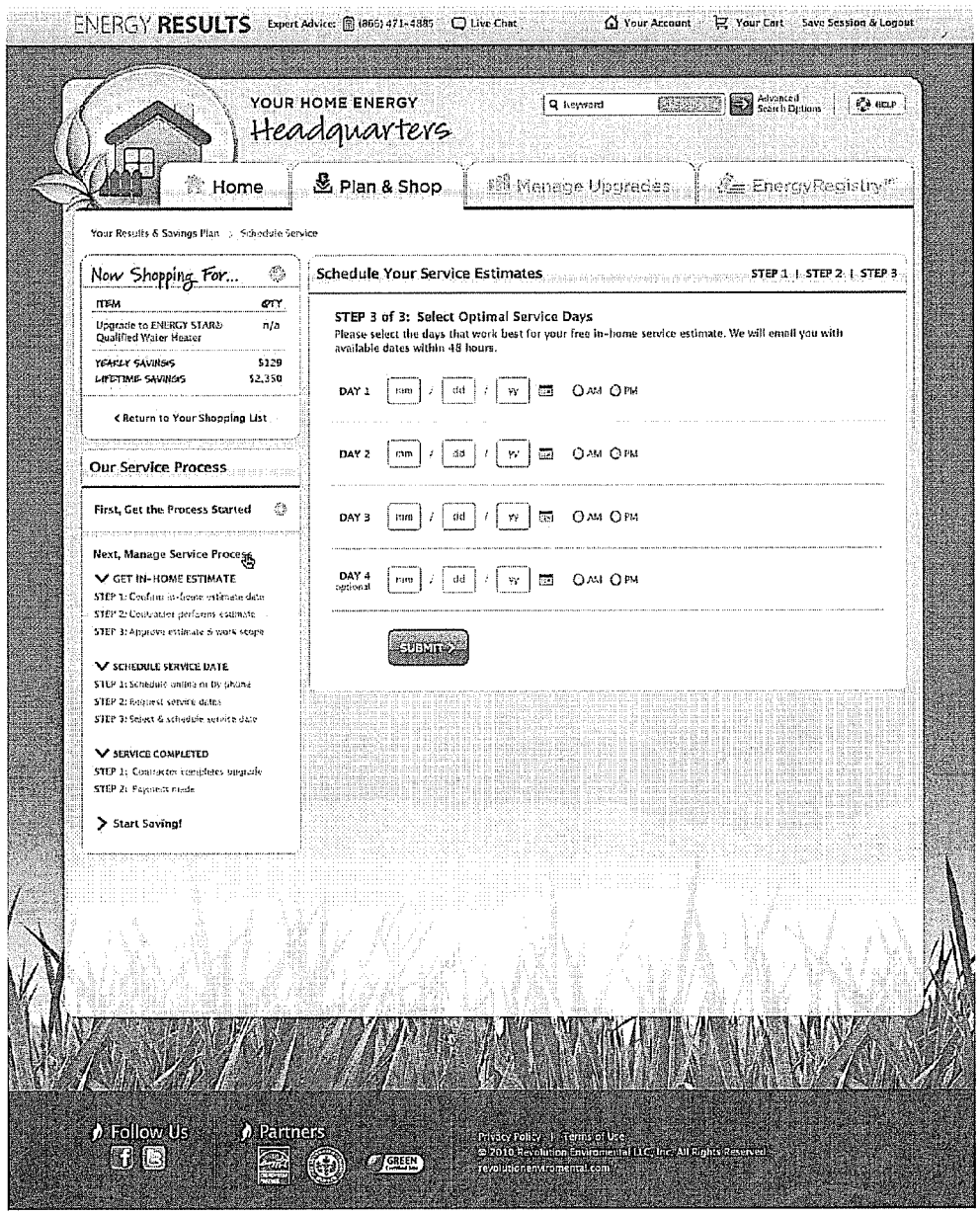
FIG. 13 illustrates one embodiment within the operation of the method, defining the user request for available service dates through the Service Management System.
Figure 14A:
FIGS. 14(a) and 14(b) illustrate one embodiment within the operation of the method, defining the Upgrade management interface that allows the user to communicate through the server to the service professionals and for service professionals to communicate with the user through the Service Management System.
Figure 14B:
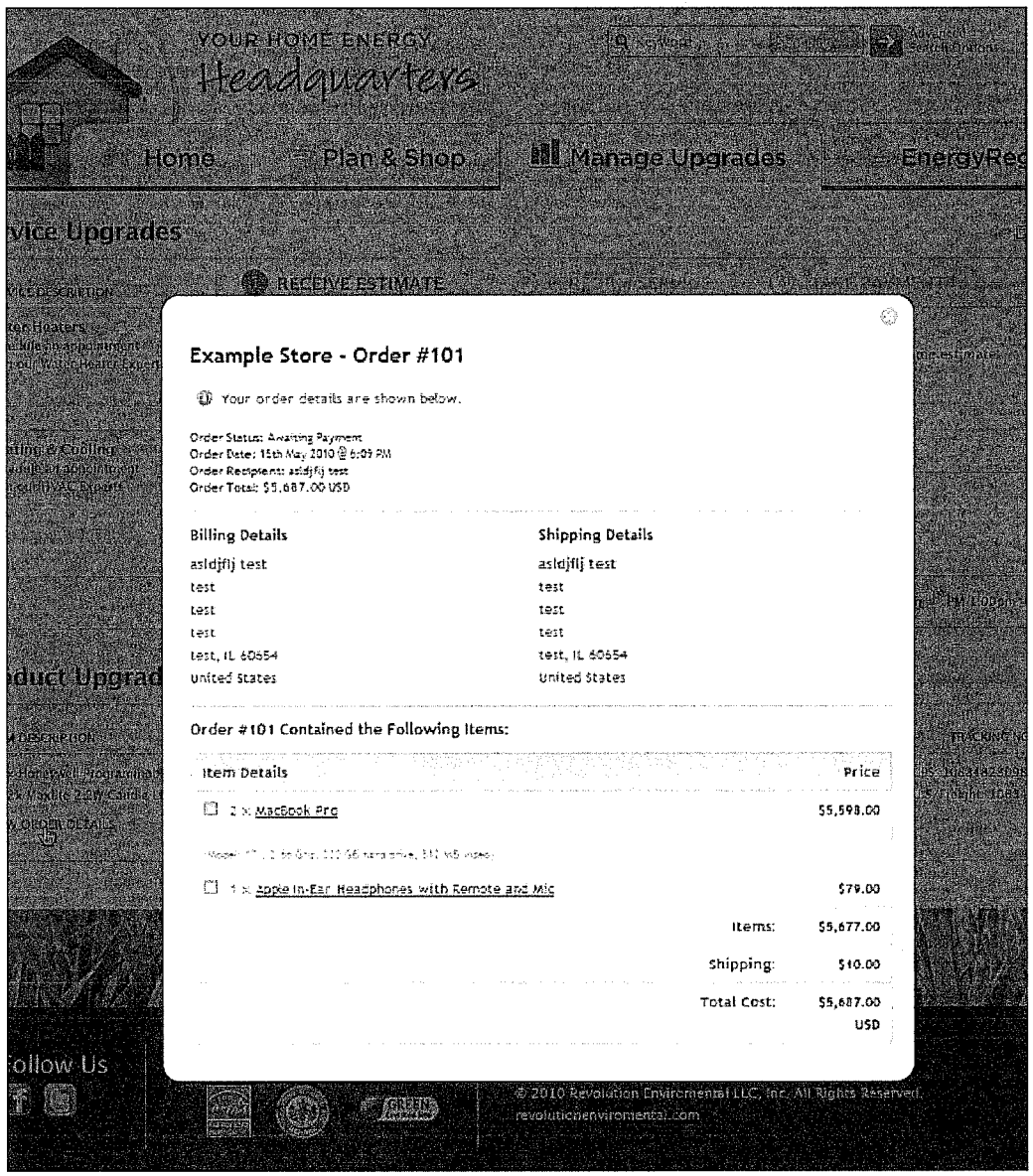
Figure 15:
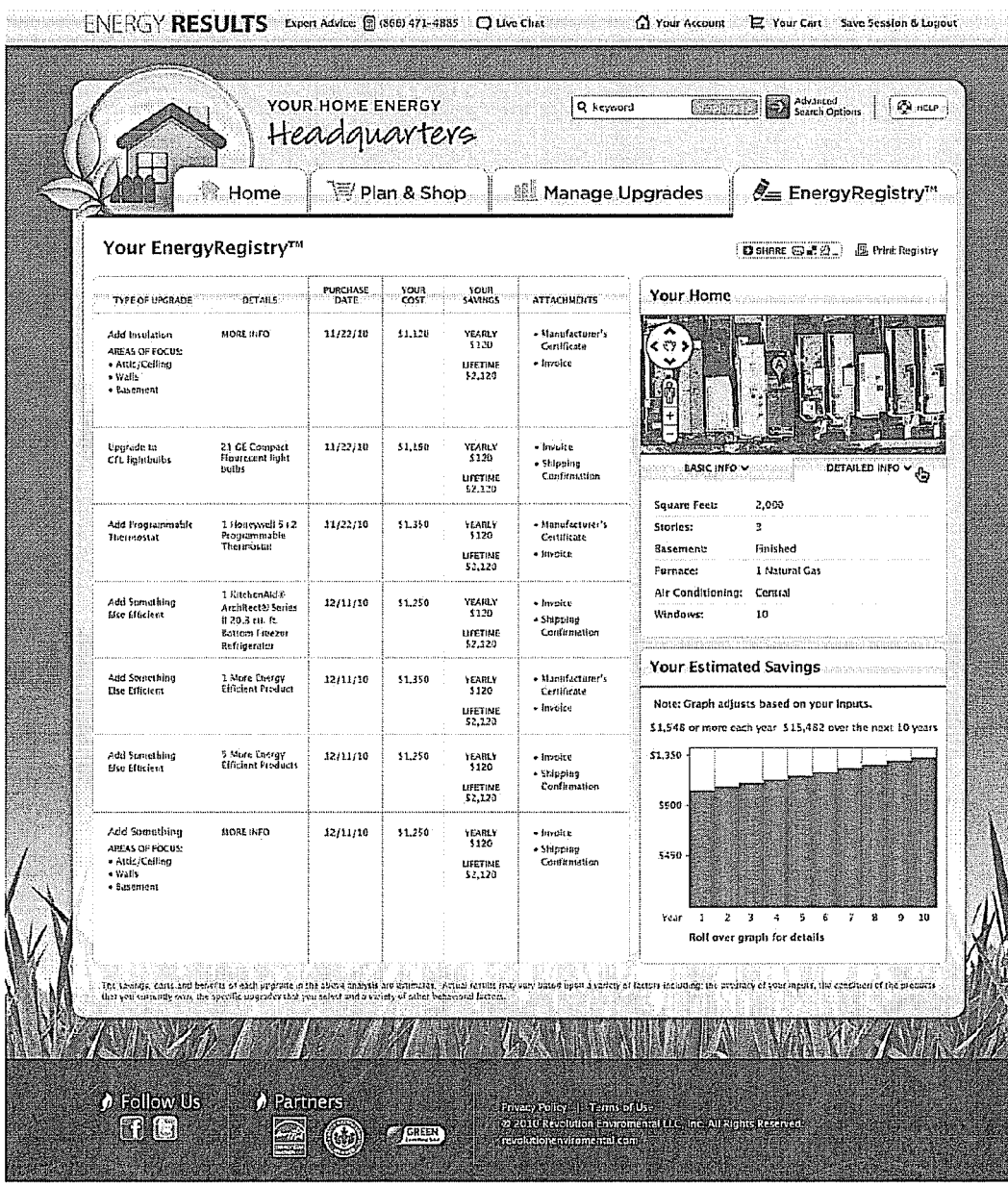
FIG. 15 illustrates one embodiment within the operation of the method, defining the registry of completed Upgrades.

M2; Implement Upgrades:
  M2.1; Enable and Facilitate Product Selection and Purchase: As needed, the user then customizes the product selections associated with their selected Upgrades to match their exact needs and/or desires. For example, once a user identifies that they want to purchase Compact Fluorescent Light bulbs (CFL), they can customize the wattage/lumens, and/or bulb color, and/or bulb shape and number of bulbs that they would like to purchase. Similarly, the user can select specific product(s) to purchase in each applicable selected upgrade category, based upon varying quantitative and qualitative attributes applicable to each product (see FIG. 10). Additionally, in the product-selection-and-purchase phase, the user can, at their option, utilize a dynamic, single-solution portion of the VHEA to analyze the relative cost savings and financial impact and/or environmental impact of products within the specific product category. For example, the user can determine which CFL light bulb provides the optimal financial impact and/or environmental impact for the consumer, thereby assisting the user in their product selection.
  M2.2; Facilitate Service Execution by Experienced Professionals: The user then transitions to the execution of the user's requested services.
  M2.2(a): The service process begins when the user confirms their desired service Upgrade or set of service Upgrades (see FIG. 11).
  M2.2(b): Upon confirmation of the services requested, as referenced in M2.2(a), the user then elects to manage their requested services through: (i) a server-based Service Management System (SMS) or (ii) a Representative Assisted approach, or a combination of approaches (i) and (ii) as the user desires. This aspect of the platform is preferably described on the user interface thereof with a relatively significant amount of precision as this service module (phase) often presents significant complexity to consumers. The platform's flexible SMS makes the process easy and transparent for both consumers and service professionals.
  i. System Management System (SMS):
    M2.2(i)(c): Once the user confirms their request for service as referenced in M2.2(a) and selected to use the SMS as referenced in M2.2(b), the system generates a request for an in-person estimate (if an estimate is not required, then service is requested) to one or more service professionals from a network of service providers based on the user's type of request and geographic location. The user is able to request up to four (4) preferred dates for the appointment (see FIG. 13).
    M2.2(i)(d): The applicable service professional(s) receives the notice and responds by submitting their available dates and times for the appointment. The SMS provides the available dates and times to the user, optimizing around the dates that were requested by the user in M2.2(i)(c).
    M2.2(i)(e): The user then selects their requested appointment date and time, causing a notice to be generated to the applicable service professional(s) confirming service. The user may thereafter receive a phone call and/or e-mail (or similar form of personal contact) from the service professional(s) prior to the date of service to confirm the time and date of service (e.g. 24-48 hours prior to the date of service).
    M2.2(i)(f): The in-person estimate is completed by the service professional (if no estimate is required, service is performed).
    M2.2(i)(g): Once the in-person estimate is completed, the service professional(s) enters their work scope and estimate into the SMS customized user interface that resides on the platform and this estimate is then displayed in the customized interface for the given user.
    M2.2(i)(h): The user receives the work scope and estimate and confirms which services and/or vendors they would like to proceed with for final service.
    M2.2(i)(i): The user again submits their requested appointment dates for service(s) to be completed, causing a notice to be generated and sent to the applicable service professional(s).
    M2.2(i)(j): The service professional(s) responds with available dates for service based on the user's indicated preferences. These available dates are entered into the customized SMS user interface that resides on the platform and is displayed to the user.
    M2.2(i)(k): The user selects their desired service date, causing a notice to be sent to the applicable service professional(s). The user may thereafter receive a phone call and/or e-mail (or similar form of personal contact) from the service professional(s) prior to the date of service to confirm the time and date of service (e.g. 24-48 hours prior to the date of service).

M2.2(i)(l): Service is completed and confirmation is sent to the user to confirm satisfaction with service.

M2.2(i)(m): User confirms service completion and payment for services is processed.

ii. Representative Assisted:

M2.2(ii)(c): Once the user confirms their request for service(s) as referenced in M2.2(a) and selects to use the Representative Assisted approach, as referenced in M2.2(b), the user provides contact information requested by the system, causing a notice to be sent to one or more system managers (the Representative).

M2.2(ii)(d): The Representative contacts the network of service professional(s) in the user's area of residence and applicable to the service(s) requested to notify them of the service request and request the dates and times to provide a service estimate(s) (or service if in-person estimate is not required).

M2.2(ii)(e): The Representative may then aggregate the dates and times and communicate them to the user.

M2.2(ii)(f): The user then selects a requested date (or dates) of service and the Representative contacts the applicable service professional(s) to confirm service. The user may thereafter receive a phone call and/or e-mail (or similar form of personal contact) from the service provider prior to the date of service to confirm the time and date of service (e.g. 24-48 hours prior to the date of service).

M2.2(ii)(g): The in-person estimate is completed by the service professional (if not estimate is required, service is performed).

M2.2(ii)(h): Once the in-person estimate is completed, the service professional(s) enter the work scope and estimate into the SMS where the Representative accesses this information.

M2.2(ii)(i): The work scope and estimate is then communicated to the user by the Representative. The user then confirms which services and/or vendors they would like to proceed with for final service and requests preferred dates of service.

M2.2(ii)(j): The Representative schedules the service date with the applicable service professional(s) and communicates this date to the user. The user will receive a phone call and/or e-mail (or similar form of personal contact) from the service provider prior to the date of service perhaps to confirm the time and date of service (e.g. 24-48 hours prior to the date of service).

M2.2(ii)(l): Service is completed and the Representative contacts the user to confirm satisfaction with service.

M2.2(i)(m): User confirms service completion and payment for services is processed.

Each of the steps listed above in M2.2(i)(c) through M2.2(ii)(l) are mirrored in the user interface residing on the platform and information is accessible by the user, the Representative and the service professional (s) at (preferably substantially) all times. This allows the user to conduct the service management and execution through a combination of the SMS and the Representative Assisted approach and tailored based on each user's needs and preferences.

M3; Finance & Track Upgrades:

M3.1; Offer Access to Financing Solutions: In some embodiments, the user can select to apply for financing to support their purchase of the selected Upgrades. This financing module provides a vehicle for the user to capture energy savings and amortize the cost of the Upgrades over a period of time. Given the cost savings generated by the Upgrades, in some instances the user may be able to repay such financings through such energy cost savings. Financing solutions may encompass a variety of financing vehicles and also may be provided by lenders in the private sector or through federal, state, city or other municipal financing programs.

M3.2; Maintain a Registry of Competed Upgrades: In some embodiments, the platform enables the user to select, if desired, to have the Upgrades that they have completed recorded in a unique registry, or database, that may be maintained on one or more network servers. This registry provides the user with a mechanism by which to confirm to verify completed Upgrades and associated cost savings and environmental benefits to third parties. These third parties may include tax authorities or future buyers of the user's home, to name only a few examples. Through this mechanism, the user is more likely to receive the appropriate "credit" (e.g. increased assessed value of the home) from the aforementioned third parties and others for the energy-savings, and associated cost savings and environmental benefits, produced by the competed Upgrades.

Outside of the functionality outlined above, the platform may also offer alternative launch points, which the user can optionally select for a more targeted experience. Some examples of such launch points include:

(1) The user selects an option (e.g. hyperlink) to learn about a specific product or service, and receives information on the product and service itself. From this launch point the user has the ability to interface with the applicable portion of the VHEA to determine the estimated financial and/or environmental impact of each available energy solution, on an independent or relative basis (a "micro-VHEA" or "single solution VHEA"). This energy-cost-savings analysis can be performed through the entry of a limited amount of data on the part of the user, sometimes as little as the user's zip code, geographical location or standardized performance estimates. The user can compare the savings of this product or service to others, or they can select to purchase that particular product or schedule the service.

(2) The computer server may in some embodiments be able to utilize a subset(s) of the VHEA and the platform to meet the needs of specifically-defined groups of individuals, such as those that rent their homes. These defined portals allow for a tailored experience offering specific products and services that are especially pertinent to a particular group. For example, those who rent their homes are often very interested in saving money on their energy bills and becoming more environmentally responsible, yet it is very unlikely that they will have the ability or the desire to execute some solutions, for example to install insulation. In this scenario, the server-based platform offers renters a tailored set of solutions that are optimal for a renter to purchase, such as CFL light bulbs and/or programmable thermostats that provide tangible energy-cost savings with a relatively short Payback Period. The objective of these defined portals is to create a mechanism where a more specialized group of users can receive the same user-friendly, customized experience.

(3) Some embodiments may enable users to compare applicable products and/or services. Along with providing general information about the products and/or services, the platform may interact with the applicable portion of the VHEA to determine the estimated energy-demand differences between individual products and/or services, providing an assessment of the estimated financial and/or environmental differences between each available solution. For example, this tool can be utilized when comparing multiple televisions for purchase. The lifetime energy costs for each TV can be combined with the upfront cost of the TV to determine which product has the lower total lifetime cost.

The present methods and systems seek to make energy responsibility easy and attainable for everyone. In motivating and facilitating consumer action, the platform provides numerous benefits directly to the consumer, but also provides significant societal and environmental benefits. The goals of the present methods and systems include, but are not limited to:

1. Increasing awareness and education regarding energy efficiency and responsibility;
2. Motivating consumer action;
3. Reducing energy usage and energy bills for consumers;
4. Bringing about greenhouse-gas reductions ($CO_2e$) through reduced energy usage and/or renewable energy generation;
5. Reducing dependence on fossil fuels used in energy generation; and
6. Creating significant new "green jobs," principally in the service sector but also in manufacturing and supply chains, related to energy-efficient and renewable-energy products.

EXAMPLES

The examples that follow are illustrative of specific embodiments, and are set forth for explanatory purposes only, and are not meant to be taken as limiting the scope of the claims.

Example 1

Wide Scope or Extensive Use of Platform

Mr. and Mrs. Jones are the owners of a 2,000 square foot single-family detached home located in Winnetka, Ill., about 21 miles north of Chicago where they reside with their two children. Their two-story home with finished basement was built around 1965. Mr. and Mrs. Jones spend a considerable amount of their disposable income each month on their electric and heating bills, with the electric bill seeing a considerable spike each summer as they cool their home through the centralized air conditioning system during the hot and humid summer months and their heating bills spike as they warm their home through natural gas in the frigid winters. Mr. and Mrs. Jones have heard a considerable amount about various energy solutions and have recently heard about increased tax advantages to assist financially in implementing these solutions, but don't know of an effective means to analyze the numerous solutions that are available to them, which will assess the financial and environmental impact of these decisions. They also find the task of implementing all of these solutions imposing, and they also wonder whether they have enough discretionary savings available to spend on these projects.

A friend tells Mrs. Jones about the residential-energy-solutions platform described herein. Mr. and Mrs. Jones access the platform, and choose to complete the Virtual Home Energy Audit in order to analyze energy alternatives that are available to them. They input a modest amount of information about where they live and about their home, and the computer server quickly produces a list of possible energy-saving solutions that they can implement. This assessment provides thorough, objective, and easy-to-understand information regarding the financial costs and benefits of each solution, including available tax subsidies, and the associated environmental benefits. After studying the information, Mr. and Mrs. Jones select a set of product and solutions that are right for them.

Mr. and Mrs. Jones select to upgrade their furnace, install a programmable thermostat, add insulation to their attic, and seal the leaks throughout their house. These solutions are expected to save them $410 in energy costs per year and reduce their $CO_2e$ emissions by 6,400 pounds. They also select and are approved to finance their purchase, and are thrilled that the cost savings on their electric and gas bills will more than pay for the amount owed on the loan annually and they will be able to repay the loan in 5 years. The computer-server-based platform helps them to manage the service contractors throughout the process, and makes implementation quick and easy. Mr. and Mrs. Jones also select to have the upgrades that they've made listed in the computer server's registry so that they can refer anyone who inquires in the future to review the upgrades that they made.

Example 2

Narrow Scope Use of Platform

Mr. and Mrs. Harris are the owners of a 1,500-square-foot condo located in New York, N.Y. Mr. and Mrs. Harris's refrigerator breaks down and is not repairable. Mr. Harris decides that he would like to purchase an Energy Star-approved refrigerator, but he is not sure if the financial impact and/or environmental impact make it worth pursuing. Mr. Harris access the herein-disclosed platform, reads information about refrigerators, and decides to take the single-solution version of the VHEA to assess the specific benefits that he would receive from purchasing an Energy Star-approved refrigerator relative to a less energy-efficient option. Mr. Harris then narrows down his selection to two items that he would like to purchase; one Energy Star-approved and one not. Mr. Harris sees that, for him, there is both a sizable financial and environmental impact from purchasing an Energy Star-approved refrigerator, which he therefore does.

Example 3

Educational Use of Platform

Ms. Wilson is a single mother with two children. She and her children live in a 2,200-square-foot home in Carmel, Ind., which is approximately 20 miles outside of Indianapolis. Ms. Wilson has seen and heard a considerable amount of information about residential wind energy, and is very interested to learn more about wind energy, and to decide whether a wind installation at her home is right for her. Ms. Wilson accesses the herein-disclosed platform and selects, "Learn About Wind Energy," in the Energy 101 section of the homepage. This "Micro-Wind Energy 101" page provides Ms. Wilson with information about wind-energy types and techniques. She is intrigued by the information, but wants to quantify the expected cost savings of wind energy relative to upfront costs, while taking into account available tax subsidies.

By using the quantitative extension of the Wind Energy 101 page, Ms. Wilson enters a limited set of information about her home and where she lives. The data entered is specifically designed to provide Ms. Wilson with an estimate of the economics of the wind decision. Ms. Wilson enters the information and receives a summary analysis of wind energy for her home. The platform then provides a mechanism by which Ms. Wilson can compare the wind solution to other viable energy solutions. Ms. Wilson discovers that, while wind is an intriguing energy solution, there are other solutions that are more financially attractive for her family to implement, specifically installing a programmable thermostat and installing new insulation in her attic. Using the platform, Ms. Wilson proceeds to learn more about these products. In learning more about wind energy, Ms. Wilson understands that an increase in energy prices and/or a compression in the cost of wind equipment and associated installation may make the wind decision more attractive for her and her family in the future. Ms. Wilson requests to be contacted when wind makes financial sense for her to implement.

Example 4

Defined Use of Platform

Mr. and Mrs. Gupta live in San Francisco, Calif. They are looking to purchase a 40" TV and have heard on TV that they should be concerned about how much energy different TVs consume. Mrs. Gupta decides to explore purchasing products on the herein-disclosed computer-server-based platform. On this platform she is able to compare both the upfront cost of each TV and the lifetime energy cost. Mrs. Gupta finds 2 TVs that she likes. One is a plasma TV and the other is an LCD TV. The Plasma TV costs $75 less to purchase, but the platform lets her know that the plasma TV is much less energy-efficient, and will cost $126 more in energy costs to run over the lifetime of the TV. Therefore, Mrs. Gupta purchases the LCD TV.

Example 5

Defined Use of Platform

Mr. and Mrs. Jones, from Example #1 above, decided to have the energy product and service solutions that they purchased entered into an accessible registry that is contained on a computer server. Mr. and Mrs. Jones and their neighbor have been friends for 20 years; both of their houses have exactly the same layout and construction (and were built by the same builder). They both decide to move to Florida and retire to the same condo complex. Therefore, they both put their houses on the market at the same time. Mr. and Mrs. Jones market their home as having lower energy costs than comparable houses and provide prospective buyers with a link to the energy upgrade registry to validate the upgrades they have made to their home. Both houses sell within 2 weeks of each other, but Mr. and Mrs. Jones's house sells first and for $8,500 more. ($20.73 for every $1 in energy cost savings).

Various embodiments have been described above. Those skilled in the art will understand, however, that changes and modifications may be made to those examples without departing from the scope of the claims.

The invention claimed is:

1. A method comprising:
 a networked server receiving via a communication interface a home-energy audit request from a communication device associated with a user, the server comprising the communication interface, a processor, and instructions executable by the processor;
 responsive to receiving the audit request, the networked server sending via the communication interface to the communication device a set of one or more audit questions pertaining at least to a home of the user;
 the networked server receiving via the communication interface from the communication device a set of one or more audit answers provided by the user to the set of audit questions;
 responsive to receiving the set of answers, the networked server (i) generating an energy-savings plan for the user based at least in part on at least one of the received answers, the energy-savings plan listing at least one energy-savings upgrade available for implementation with respect to the user's home, wherein the energy-savings plan comprises an estimated environmental impact of at least one upgrade listed in the plan, and wherein at least one such estimated environmental impact pertains to at least one of $CO_2$ and $CO_2e$, and (ii) sending the generated energy-savings plan via the communication interface to the communication device;
 after sending the generated energy-savings plan, the networked server receiving via the communication interface from the communication device a user selection of at least one upgrade listed in the plan; and
 responsive to receiving the user selection, the networked server placing at least one order on behalf of the user for the at least one selected upgrade.

2. The method of claim 1, wherein the user interacts with the networked server via a web-browsing application running on the communication device.

3. The method of claim 1, wherein the communication device comprises at least one of a computer, a desktop computer, a laptop computer, an e-reader, a tablet device, a PDA, and a cell phone.

4. The method of claim 1, wherein the set of audit questions pertains to at least one of type of the home, whether the user is a renter, number of occupants of the home, age of the home, option to use natural gas in the home, type of foundation of the home, square footage of the home, type of basement of the home, type of heating and cooling systems, type of water-heating systems, type and number of appliances, type of lighting, type of electronics, type and number of water-using devices, and elements of an envelope of the home.

5. The method of claim 1, wherein the set of audit questions further pertains to a geographic location of the user's home.

6. The method of claim 1, wherein generating the energy-savings plan for the user based at least in part on at least one of the received answers comprises generating the energy-savings plan for the user based at least in part on at least one of the received answers and at least in part on additional data reflecting one or more of weather-pattern data, temperature-pattern data, and energy-price data.

7. The method of claim 6, wherein at least one audit question pertains to a geographic location of the user's home, wherein the set of audit answers comprises the geographic location of the user's home, and wherein at least part of the additional data is specific to the geographic location of the user's home.

8. The method of claim 1, wherein at least one energy-savings upgrade listed in the generated plan comprises a product.

9. The method of claim 8, wherein the product is selected from a group consisting of a lighting and fixtures option, an appliance option, a heating and cooling option, an electronics and office equipment option, a plumbing and water option, a solar-energy product, and a wind-energy product.

10. The method of claim 1, wherein at least one energy-savings upgrade listed in the generated plan comprises a service.

11. The method of claim 10, further comprising:
sending the user a list of scheduling options for the service;
receiving from the user a selected scheduling option for the service; and
scheduling the service for the user in accordance with the selected option.

12. The method of claim 1, wherein at least one energy-savings upgrade listed in the generated plan comprises an option to receive a quote for a cost of a service.

13. The method of claim 12, further comprising:
sending the user a list of scheduling options for receiving the quote;
receiving from the user a selected scheduling option for receiving the quote; and
scheduling the user to receive the quote in accordance with the selected option.

14. The method of claim 12, further comprising:
receiving at least one quote for the service from at least one service provider;
sending the received at least one quote to the user;
receiving from the user a selected quote; and
scheduling the user to receive the service from the associated service provider.

15. The method of claim 1, wherein the generated plan further comprises at least one of estimated financial impact of at least one upgrade listed in the plan.

16. The method of claim 15, wherein at least one such estimated financial impact reflects at least one of total cost of the upgrade, upfront cost of the upgrade, taxes, energy costs, internal rate of return, return on investment, and payback period.

17. The method of claim 1, wherein at least one energy-savings upgrade listed in the generated plan relates to at least one of (i) an improvement in energy efficiency and (ii) a renewable source of energy.

18. The method of claim 1, further comprising the networked server providing the user with at least one financing option related to at least one selected upgrade.

19. The method of claim 1, further comprising maintaining a digital registry of completed energy-saving upgrades on at least one of (i) a user-by-user basis and (ii) a home-by-home basis.

20. A networked server comprising:
a communication interface;
a processor; and
data storage comprising instructions executable by the processor for carrying out functions including:
receiving a home-energy audit request from a communication device associated with a user;
responsive to receiving the home-energy audit request, sending via the communication interface to the communication device a set of one or more audit questions pertaining at least to a home of the user;
receiving via the communication interface from the communication device a set of one or more audit answers provided by the user to the set of audit questions;
responsive to receiving the set of answers, (i) generating an energy-savings plan for the user based at least in part on at least one of the received answers, the energy-savings plan listing at least one energy-savings upgrade available for implementation with respect to the user's home, wherein the energy-savings plan comprises an estimated environmental impact of at least one upgrade listed in the plan, and wherein at least one such estimated environmental impact pertains to at least one of $CO_2$ and $CO_2e$, and (ii) sending the generated energy-savings plan via the communication interface to the communication device;
after sending the generated energy-savings plan, receiving via the communication interface from the communication device a user selection of at least one upgrade listed in the plan; and
responsive to receiving the user selection, placing at least one order on behalf of the user for the at least one selected upgrade.

* * * * *